(12) United States Patent
Sano et al.

(10) Patent No.: US 10,692,656 B2
(45) Date of Patent: Jun. 23, 2020

(54) FILM CAPACITOR AND METHOD FOR MANUFACTURING FILM CAPACITOR

(71) Applicant: Panasonic Intellectual Property Management Co., Ltd., Osaka (JP)

(72) Inventors: Masahito Sano, Shimane (JP); Taiyou Tsukahara, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/267,427

(22) Filed: Feb. 5, 2019

(65) Prior Publication Data
US 2019/0172650 A1    Jun. 6, 2019

Related U.S. Application Data

(63) Continuation of application No. PCT/JP2017/027426, filed on Jul. 28, 2017.

(30) Foreign Application Priority Data

Sep. 15, 2016  (JP) ................. 2016-180224

(51) Int. Cl.
  *H01G 4/33*   (2006.01)
  *H01G 4/015*  (2006.01)
  *H01G 4/18*   (2006.01)

(52) U.S. Cl.
  CPC .............. *H01G 4/33* (2013.01); *H01G 4/015* (2013.01); *H01G 4/18* (2013.01)

(58) Field of Classification Search
  CPC .. H01G 2/16; H01G 2/14; H01G 4/18; H01G 4/32; H01G 4/015; H01G 4/33
  See application file for complete search history.

(56) References Cited

U.S. PATENT DOCUMENTS 4,422,127 A * 12/1983 Lavene .............. H01G 4/32
                                               361/323
5,057,967 A * 10/1991 Den .................. H01G 4/38
                                               361/328
(Continued)

FOREIGN PATENT DOCUMENTS

JP      2014-067793      4/2014

OTHER PUBLICATIONS

International Search Report of PCT application No. PCT/JP2017/027426 dated Oct. 24, 2017.

*Primary Examiner* — Eric W Thomas
(74) *Attorney, Agent, or Firm* — McDermott Will & Emery LLP

(57) ABSTRACT

A film capacitor according to the present disclosure includes a first film and a second film wound in a stacked state and a first deposition electrode and a second deposition electrode that are formed by metal deposition. The second deposition electrode includes widthwise slit portions, the widthwise slit portions crossing the second deposition electrode in its widthwise direction, split electrodes split by the widthwise slit portions, and a longitudinal slit portion extending in a longitudinal direction of the second deposition electrode in an ineffective electrode region shifted from an effective electrode region in the widthwise direction of the second deposition electrode. Each split electrode includes a first fuse portion bridging over a longitudinal slit portion and a second fuse portion that bridges over a widthwise slit portion and can be fused with a current smaller than a current for the first fuse portion.

5 Claims, 18 Drawing Sheets

(56) References Cited

U.S. PATENT DOCUMENTS

| | | | | |
|---|---|---|---|---|
| 5,136,462 A * | 8/1992 | Steiner | ............... | H01G 4/015 |
| | | | | 361/273 |
| 5,680,290 A * | 10/1997 | Akai | ............ | H01G 2/14 |
| | | | | 361/272 |
| 6,370,008 B1 * | 4/2002 | Vetter | ............... | H01G 4/008 |
| | | | | 361/273 |
| 9,318,262 B2 * | 4/2016 | Takeoka | ............ | H01G 4/015 |
| 9,536,663 B2 * | 1/2017 | Hirota | ............ | H01G 2/16 |

* cited by examiner

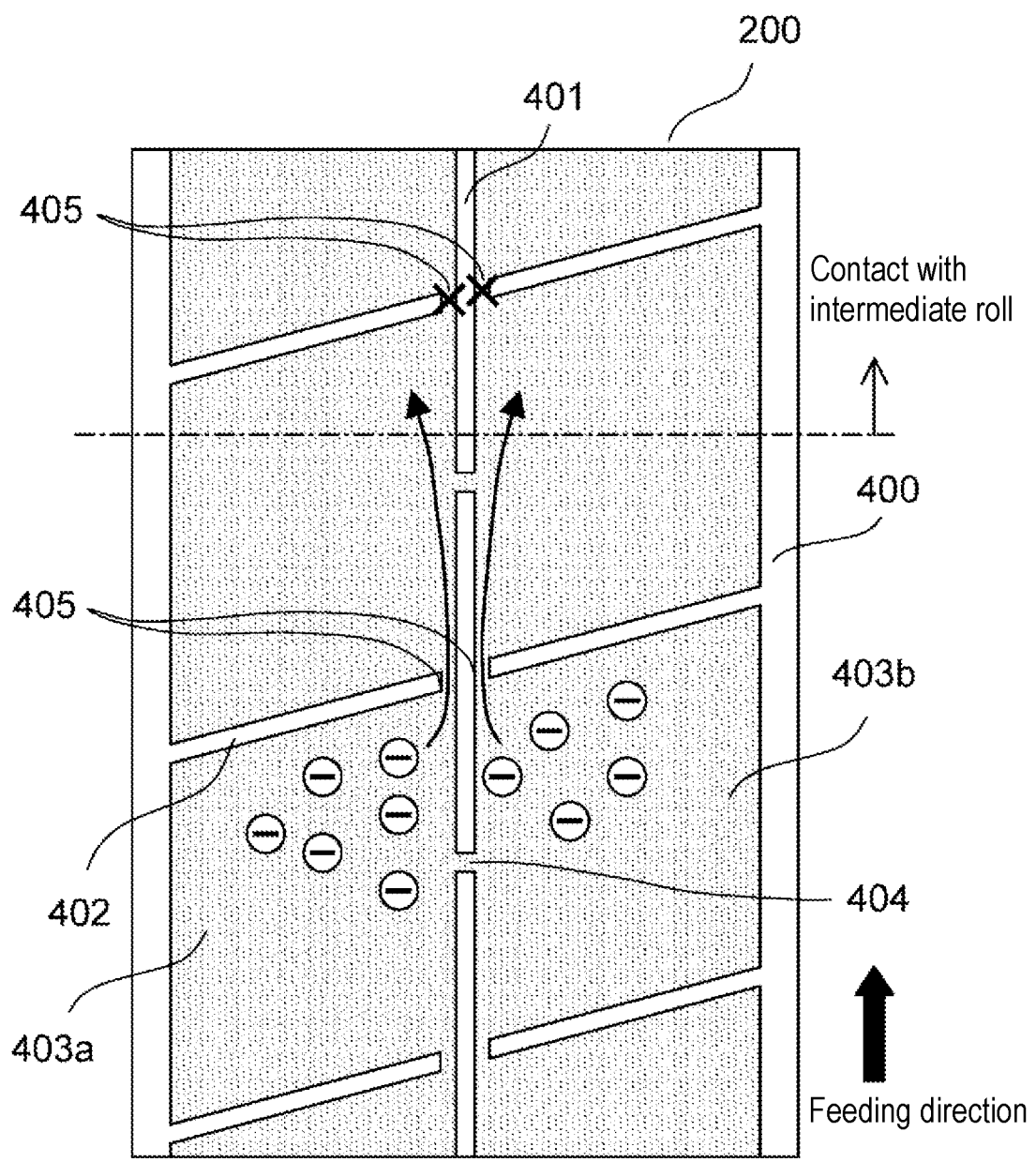

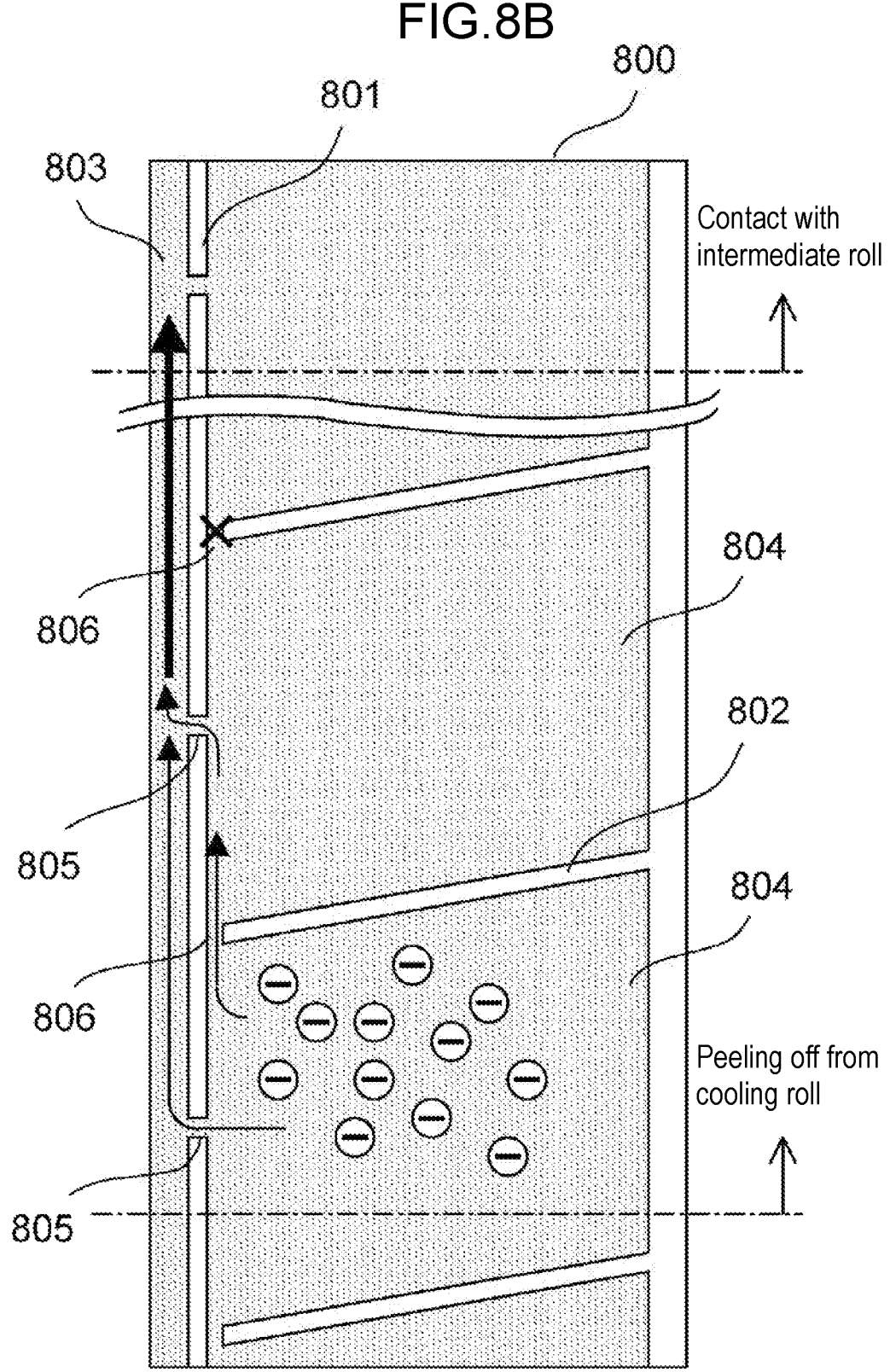

FILM CAPACITOR AND METHOD FOR MANUFACTURING FILM CAPACITOR

BACKGROUND

1. Technical Field

The present disclosure relates to a film capacitor and a method for manufacturing a film capacitor.

2. Description of the Related Art

Conventionally, there is known a film capacitor formed by winding two dielectric films, in a stacked state, having surfaces on which deposition electrodes are formed by deposition of a metal such as aluminum. In a film capacitor having such deposition electrodes, a narrow portion of a current path serving as a fuse pattern is formed on part of each deposition electrode. This prevents permanent short-circuit by scattering the fuse pattern when a dielectric film is dielectrically broken down.

For example, PTL 1 discloses a film capacitor having a structure having two capacitors connected in series, in which a fuse pattern is formed between the two capacitors.

In the film capacitor disclosed in PTL 1, common electrodes are deposited, on an upper surface of an upper film, on right and left sides of a wide middle insulating margin portion extending in a winding direction along a middle portion of the film in its widthwise direction so as to leave the middle insulating margin portion. On the other hand, on an upper surface of the lower film, many partial electrodes partitioned by a narrow winding-direction insulating margin portion extending along a widthwise middle portion of the film in the winding direction and widthwise insulating margin portions provided at predetermined intervals in the winding direction and extending in the widthwise direction of the film are deposited. Two partial electrodes arranged side by side in the widthwise direction of each film are connected via a fuse pattern.

CITATION LIST

Patent Literature

PTL 1: Unexamined Japanese Patent Publication No. 2014-067793

SUMMARY

In a process of manufacturing a film capacitor, a deposition electrode is deposited and formed on a film by using, for example, a vacuum deposition apparatus. The vacuum deposition apparatus sprays a metal serving as a deposition electrode from a deposition device. However, a temperature of this metal is high, and hence the film needs to be cooled to prevent deterioration in quality. For this purpose, the vacuum deposition apparatus feeds a film fed from an unwinding device to a cooling roll and deposits a metal on the film cooled upon contacting the cooling roll. At this time, the cooling roll and the film are charged to positive and negative polarities to make the cooling roll easily come into tight contact with the film.

The film on which a deposition electrode is formed is peeled off from the cooling roll and finally taken up by a winding device. When, however, the film is peeled off from the cooling roll, peeling charge is generated in the film. Charge retained in the film by the peeling charge is discharged to an intermediate roll side when an intermediate roll made of a metal between the cooling roll and the winding device comes into contact with the deposition electrode. At the time of peeling discharge, a current flows in the fuse pattern on the deposition electrode. This current may cause cracking (micro-cracking) in the fuse pattern.

Consider, for example, a state of the film capacitor disclosed in PTL 1, in which charge is retained by peeling charge in two partial electrodes connected via the fuse pattern and arranged side by side in a film width direction. In this state, when a partial electrode on any one of the films comes into contact with the intermediate roll first, charge in the other partial electrode moves to one partial electrode via the fuse pattern and is discharged to the intermediate roll. At this time, a current flowing in the fuse pattern can cause cracking in the fuse pattern.

It is, therefore, an object of the present disclosure to suppress occurrence of cracking in a fuse portion provided on a deposition electrode for self-preservation against dielectric breakdown of a film in a process of manufacturing a film capacitor.

A film capacitor according to a first aspect of the present disclosure includes a first film and a second film wound in a stacked state, and a first deposition electrode and a second deposition electrode each formed by metal deposition. In this case, one deposition electrode of a first deposition electrode and a second deposition electrode is disposed on one film surface of the first film, and an other deposition electrode of the first deposition electrode and the second deposition electrode is disposed on an other film surface of the first film or a film surface of the second film that faces the other film surface. The second deposition electrode includes widthwise slit portions, the widthwise slit portions crossing the second deposition electrode at predetermined intervals in a longitudinal direction of the second deposition electrode. The second deposition electrode is split into a plurality of split electrodes in the longitudinal direction by the widthwise slit portions. The second deposition electrode includes a longitudinal slit portion extending in a longitudinal direction of the second deposition electrode in an ineffective electrode region shifted, in a widthwise direction of the second deposition electrode, from an effective electrode region where the first deposition electrode and the second deposition electrode overlap each other. A first fuse portion is connected to each of the plurality of split electrodes so as to cross a longitudinal slit portion. In addition, in an ineffective electrode region between two split electrodes adjacent to each other in the longitudinal direction of the second deposition electrode among the plurality of split electrodes, a second fuse portion that can be fused by a current smaller than a current for the first fuse portion is provided so as to bridge over a widthwise slit portion between the two split electrodes among the plurality of the widthwise slit portions.

The second aspect of the present disclosure relates to a method of manufacturing a film capacitor. A film capacitor manufactured by a manufacturing method according to the second aspect includes a first film and a second film wound in a stacked state and a first deposition electrode and a second deposition electrode formed by metal deposition. One deposition electrode of the first deposition electrode and the second deposition electrode is disposed on one film surface of the first film. An other deposition electrode of the first deposition electrode and the second deposition electrode is disposed on an other film surface of the first film or a film surface of the second film that faces the other film surface. The second deposition electrode includes widthwise slit portions, the widthwise slit portions crossing the second deposition electrode in the widthwise direction of the second deposition electrode and being disposed at predetermined intervals in a longitudinal direction of the second deposition electrode. The second deposition electrode is split into a plurality of split electrodes in the longitudinal direction by the widthwise slit portions. The second deposition electrode includes a longitudinal slit portion extending in the longitudinal direction of the second deposition electrode in an ineffective electrode region shifted, in the widthwise direction of the second deposition electrode, from an effective electrode region where the first deposition electrode and the second deposition electrode overlap each other. A first fuse portion is connected to each of the plurality of split electrodes so as to bridge over a longitudinal slit portion. A manufacturing method according to this aspect deposits and forms a second deposition electrode on a film corresponding to the second deposition electrode. At this time, in an ineffective electrode region between two split electrodes adjacent to each other in the longitudinal direction of the second deposition electrode, a second fuse portion that can be fused by a current smaller than a current for the first fuse portion is provided so as to bridge over a widthwise slit portion.

The present disclosure can suppress occurrence of cracking in a fuse portion provided on a deposition electrode for self-preservation against dielectric breakdown of a film in a process of manufacturing a film capacitor.

Effects and meanings of the present disclosure will be further clarified by the following description of exemplary embodiments. However, each of the exemplary embodiments shown below is merely one example of implementing the present disclosure, and the present disclosure is not at all limited to the examples described in the following exemplary embodiments.

BRIEF DESCRIPTION OF DRAWINGS

FIG. 5A is a view for explaining discharging of charge retained in a first split electrode and a second split electrode by peeling charge in the first exemplary embodiment in which a second fuse pattern is provided on a second deposition electrode;

FIG. 8B is a view for explaining discharging of charge retained in a split electrode by peeling charge in the second exemplary embodiment in which a second fuse pattern is provided on the second deposition electrode;

DETAILED DESCRIPTION

Exemplary embodiments of the present disclosure will be described below with reference to the accompanying drawings.

First Exemplary Embodiment

Film capacitor 1A according to the first exemplary embodiment will be described first.

In this exemplary embodiment, middle insulating margin portion 101 corresponds to an "insulating margin portion" described in the appended claims. First fuse pattern 404 corresponds to a "first fuse portion" described in the appended claims. Second fuse pattern 405 corresponds to a "second fuse portion" described in the appended claims.

However, the above description is only intended to define correspondences between constituents shown in the appended claims and constituents shown in the exemplary embodiment. The correspondences described above should not be construed to limit the scope of the invention described in the appended claims to the configuration described in the exemplary embodiment.

Figure 1A:
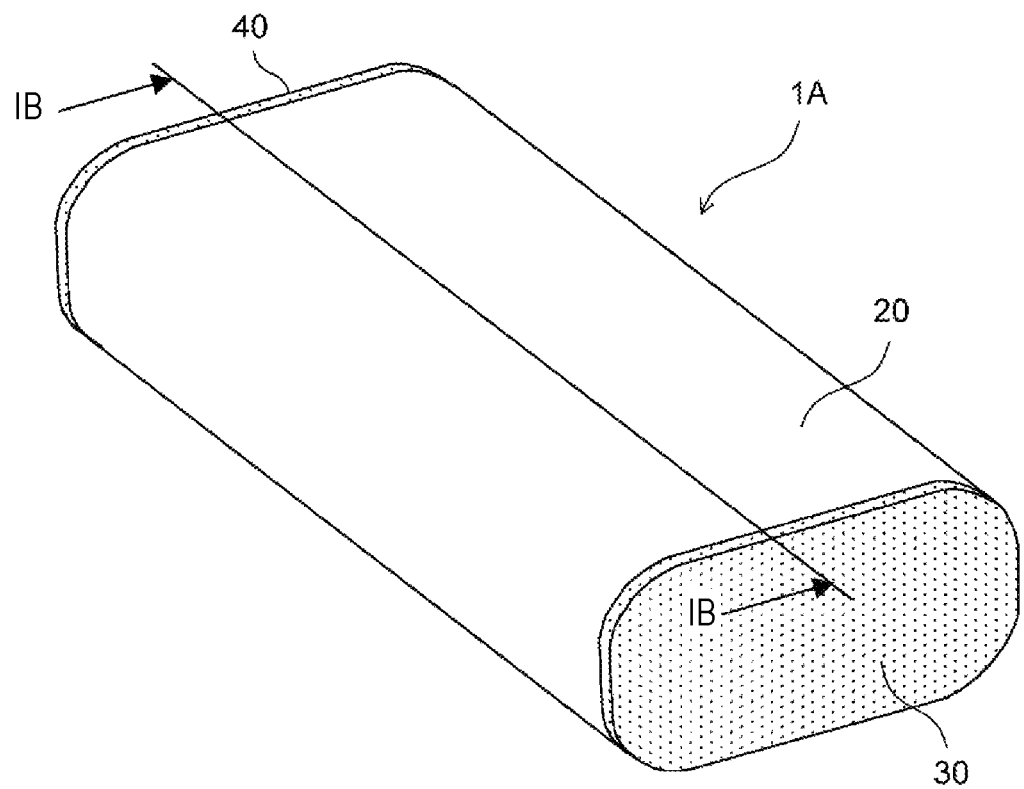
FIG. 1A is a perspective view of a film capacitor according to a first exemplary embodiment.
Figure 1B:
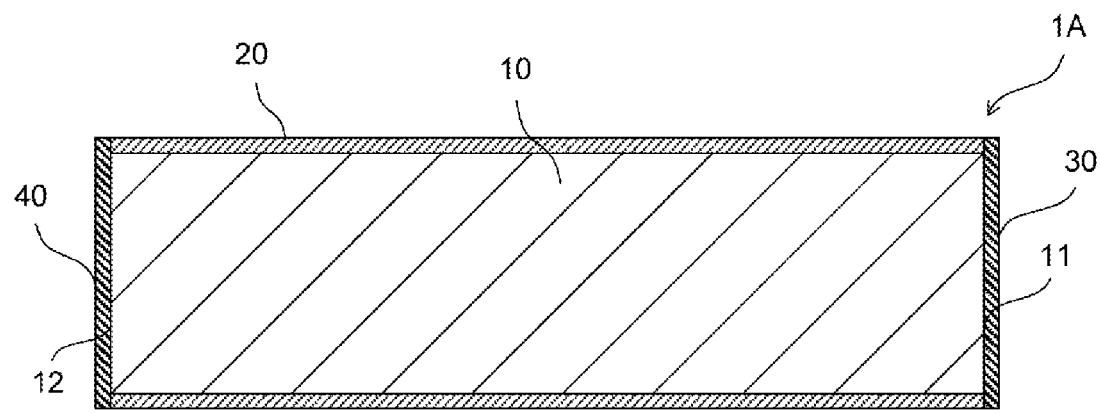
FIG. 1B is a vertical sectional view of the film capacitor according to the first exemplary embodiment taken along line IB-IB of FIG. 1A.

FIG. 1A is a perspective view of film capacitor 1A according to the first exemplary embodiment, and FIG. 1B is a vertical sectional view of film capacitor 1A according to the first exemplary embodiment taken along line IB-IB of FIG. 1A.

Film capacitor 1A includes capacitor body 10, exterior film 20, first end-face electrode 30, and second end-face electrode 40. Film capacitor 1A is formed into a flat columnar shape having an elliptic section.

Capacitor body 10 is formed by winding two dielectric films in a stacked state, on which deposition electrodes are formed. Film capacitor 1A, i.e., capacitor body 10, employs a structure having two capacitors connected in series. A configuration of capacitor body 10 will be described in detail later.

Exterior film 20 is wound around an outer circumferential surface of capacitor body 10 a plurality of times (a plurality of turns). The outer circumferential surface of capacitor body 10 is covered by exterior film 20 with a plurality of layers to prevent capacitor body 10 from, for example, being damaged or broken. Examples of a material for exterior film 20 include polypropylene (PP), polyethylene terephthalate (PET), and polyethylene naphthalate (PEN).

First end-face electrode 30 and second end-face electrode 40 are respectively formed by thermally spraying a metal such as aluminum, zinc, or magnesium onto first end face 11 and second end face 12 of capacitor body 10. A lead-out terminal (not shown) such as a bus bar or lead wire for drawing out electricity from film capacitor 1A is connected to first end-face electrode 30 and second end-face electrode 40.

A configuration of capacitor body 10 will be described in detail next.

Figure 2A:
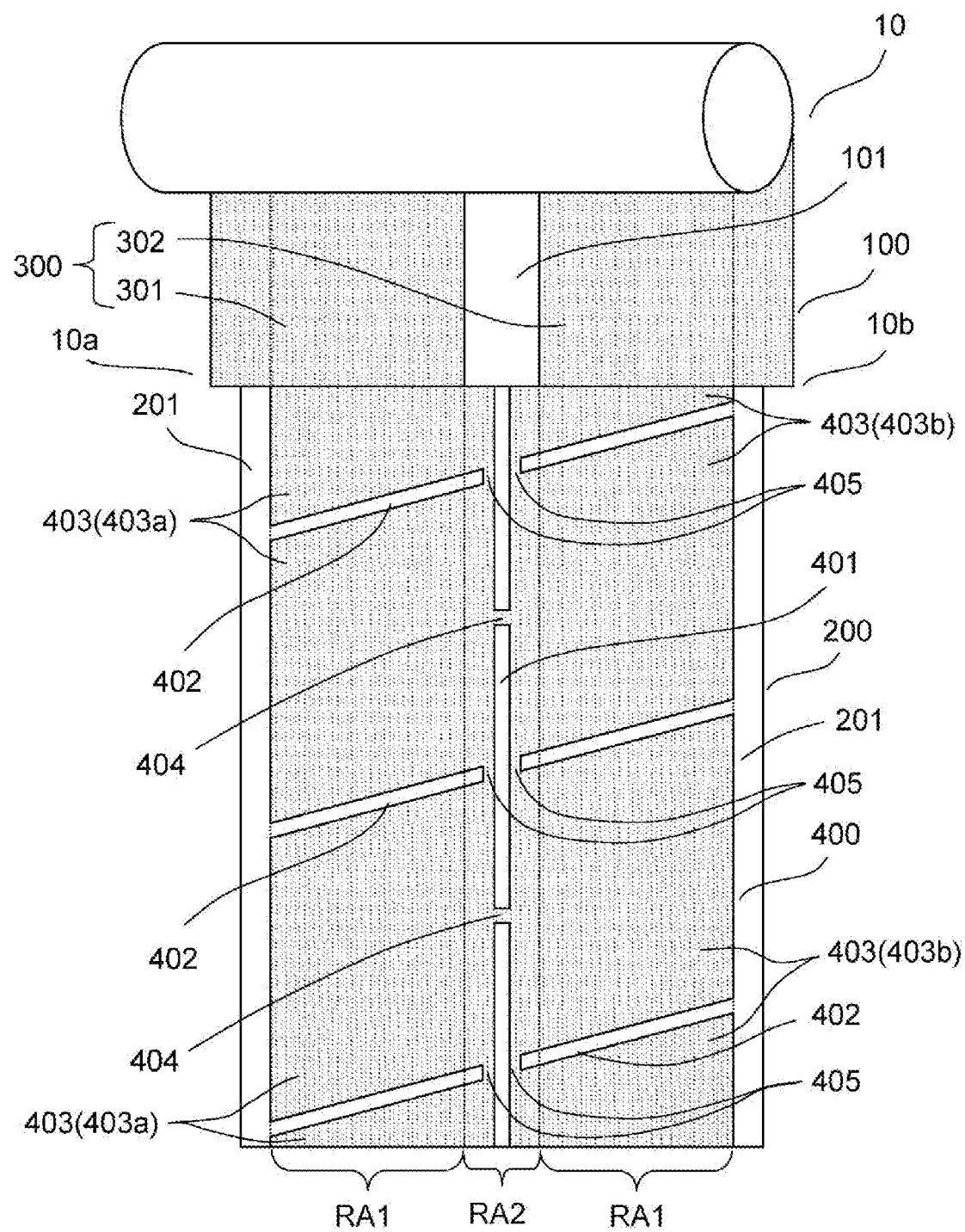
FIG. 2A is a plan view of a capacity body in a state in which a first film and a second film are partly wound according to the first exemplary embodiment.
Figure 2B:
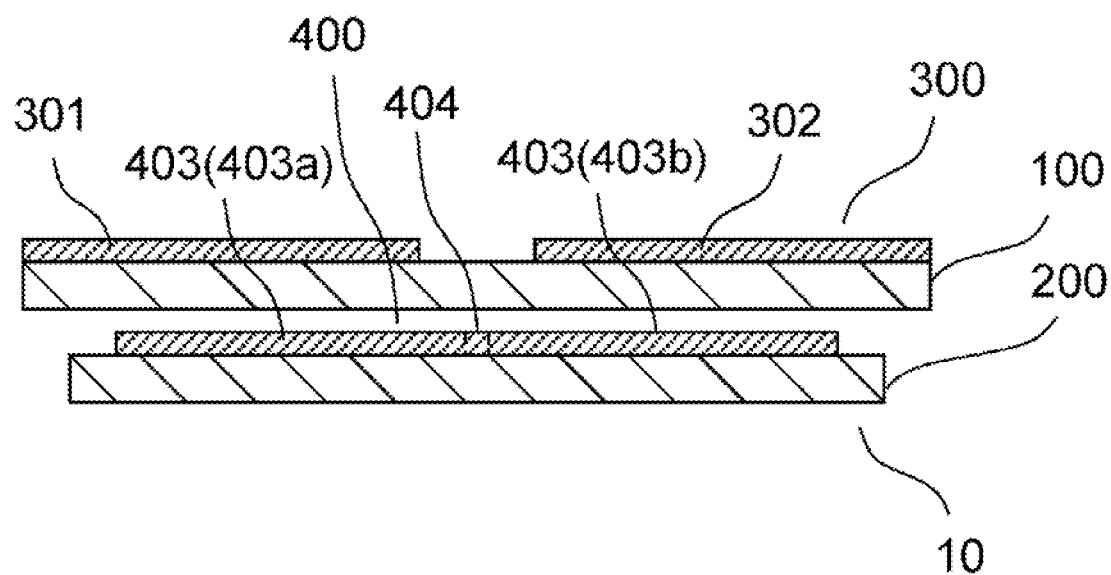
FIG. 2B is a sectional view of the capacitor body cut at a portion of a first fuse pattern in a widthwise direction according to the first exemplary embodiment.
Figure 2C:
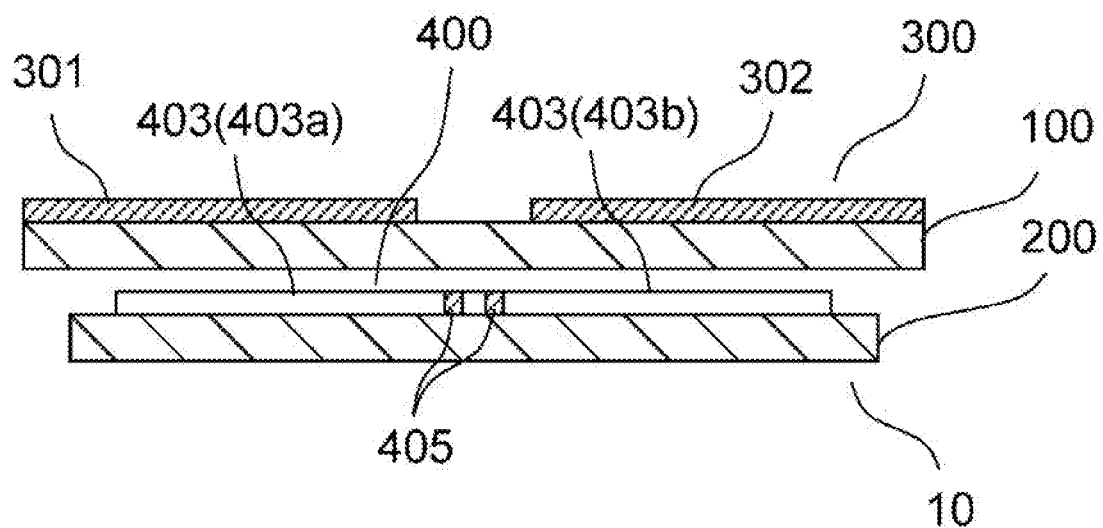
FIG. 2C is a sectional view of the capacitor body cut at a portion of a second fuse pattern in the widthwise direction along a widthwise slit portion according to the first exemplary embodiment.
Figure 2D:
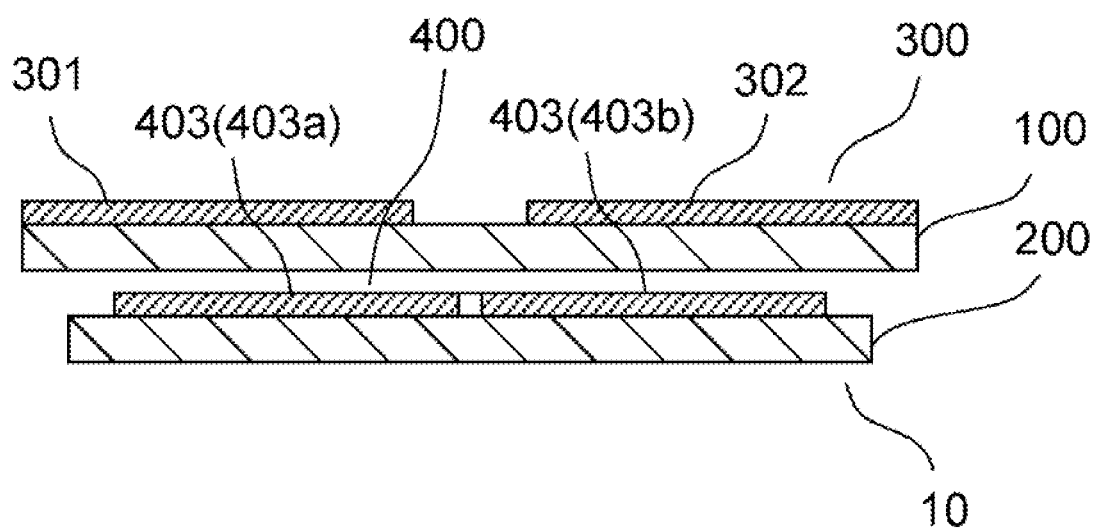
FIG. 2D is a sectional view of the capacitor body cut at a portion where neither first fuse pattern nor the second fuse pattern is provided in the widthwise direction according to the first exemplary embodiment.

FIG. 2A is a plan view of capacitor body 10 in a state in which first film 100 and second film 200 are partly wound according to the first exemplary embodiment. FIG. 2B is a sectional view of capacitor body 10 cut at a portion of first fuse pattern 404 in the widthwise direction according to the first exemplary embodiment. FIG. 2C is a sectional view of capacitor body 10 cut at a portion of second fuse pattern 405 in the widthwise direction along widthwise slit portion 402 according to the first exemplary embodiment. FIG. 2D is a sectional view of capacitor body 10 cut at a portion where either first fuse pattern 404 nor second fuse pattern 405 is provided in the widthwise direction according to the first exemplary embodiment.

Capacitor body 10 includes first film 100, second film 200, first deposition electrode 300, and second deposition electrode 400.

First film 100 and second film 200 are wound in a state in which first film 100 is located inside (on an upper side) and second film 200 is located outside (on a lower side). First film 100 and second film 200 are dielectric films each formed of a resin material such as polypropylene (PP), polyethylene terephthalate (PET), and polyethylene naphthalate (PEN). First film 100 has a larger width dimension than second film 200. Middle insulating margin portion 101 is formed on first film 100 so as to extend along a widthwise middle of first film 100 in a longitudinal direction of first film 100. End insulating margin portions 201 are formed on both widthwise ends of second film 200 so as to extend in the longitudinal direction. Middle insulating margin portion 101 and end insulating margin portions 201 are margin portions on which no metal is deposited.

First deposition electrode 300 is formed on one (upper) film surface of first film 100 by deposition of a metal such as aluminum. First deposition electrode 300 is split into first continuous electrode 301 and second continuous electrode 302 in the widthwise direction by middle insulating margin portion 101. First continuous electrode 301 and second continuous electrode 302 each are formed continuously without being split in the longitudinal direction of first film 100. First continuous electrode 301 is formed up to one end of first film 100 in the widthwise direction and is continuous with first end-face electrode 30. Second continuous electrode 302 is formed up to the other end of first film 100 in the widthwise direction and is continuous with second end-face electrode 40.

Second deposition electrode 400 is formed on one (upper) film surface of second film 200 which faces the other (lower) film surface of first film 100 by deposition of a metal such as aluminum. Second deposition electrode 400 is formed between end insulating margin portions 201 on two ends.

Second deposition electrode 400 has longitudinal slit portion 401 formed in a widthwise middle of second deposition electrode 400 so as to extend in the longitudinal direction of second deposition electrode 400. In addition, widthwise slit portions 402 are formed in second deposition electrode 400 at predetermined intervals in the longitudinal direction so as to cross the second deposition electrode 400 in the widthwise direction. Each widthwise slit portion 402 is formed to extend from end insulating margin portion 201 on one end side to end insulating margin portion 201 on the other end side so as to be inclined with respect to the widthwise direction. Second deposition electrode 400 is split into two columns of split electrodes 403 in the widthwise direction and a plurality of split electrodes 403 in the longitudinal direction by longitudinal slit portion 401 and the plurality of widthwise slit portions 402.

First capacitor 10a includes first continuous electrode 301 and each split electrode 403 (to be referred to as a "first split electrode 403a" hereinafter) facing first continuous electrode 301. Second capacitor 10b connected in series with first capacitor 10a includes second continuous electrode 302 and each split electrode 403 (to be referred to as a "second split electrode 403b" hereinafter) facing second continuous electrode 302.

Capacitor body 10 includes first deposition electrode 300, i.e., effective electrode region RA1 where first continuous electrode 301, second continuous electrode 302, and second deposition electrode 400 overlap each other, and an ineffective electrode region RA2 shifted from effective electrode region RA1 in the widthwise direction of first deposition electrode 300 and second deposition electrode 400. Ineffective electrode region RA2 is a region where second deposition electrode 400 overlaps middle insulating margin portion 101 of first film 100.

Longitudinal slit portion 401 overlaps middle insulating margin portion 101. That is, longitudinal slit portion 401 is provided in ineffective electrode region RA2. Accordingly, on second deposition electrode 400, ineffective electrode region RA2 includes portions, of each first split electrode 403a and each second split electrode 403b, which are located near longitudinal slit portion 401 overlapping middle insulating margin portion 101. In addition, effective electrode region RA1 includes a portion, of each first split electrode 403a, which overlaps first continuous electrode 301, and effective electrode region RA1 includes a portion, of each second split electrode 403b, which overlaps second continuous electrode 302. Effective electrode region RA1 formed between first continuous electrode 301 and each first split electrode 403a contributes to a capacitance of first capacitor 10a, and effective electrode region RA1 formed between second continuous electrode 302 and each second split electrode 403b contributes a capacitance of second capacitor 10b.

First fuse pattern 404 is formed between each first split electrode 403a and each second split electrode 403b so as to bridge over longitudinal slit portion 401. In other words, on second deposition electrode 400, longitudinal slit portion 401 is shortened by a width forming first fuse pattern 404. A pattern width of first fuse pattern 404 is set to, for example, about 0.5 mm.

Second fuse pattern 405 is formed in ineffective electrode region RA2 between two first split electrodes 403a adjacent in the longitudinal direction of second deposition electrode 400 so as to bridge over widthwise slit portion 402. Likewise, second fuse pattern 405 is formed in ineffective electrode region RA2 between two second split electrodes 403b adjacent in the longitudinal direction of second deposition electrode 400. In other words, on second deposition electrode 400, widthwise slit portion 402 is shortened by a width forming second fuse pattern 405. A pattern width of second fuse pattern 405 is set to a width smaller than a pattern width of first fuse pattern 404, for example, about 0.2 mm. With this setting, second fuse pattern 405 can be fused by a current smaller than a current for first fuse pattern 404.

In a process of manufacturing film capacitor 1A, first deposition electrode 300 and second deposition electrode 400 are respectively deposited and formed on first film 100 and second film 200 by using a deposition apparatus such as a vacuum deposition apparatus.

Figure 3:
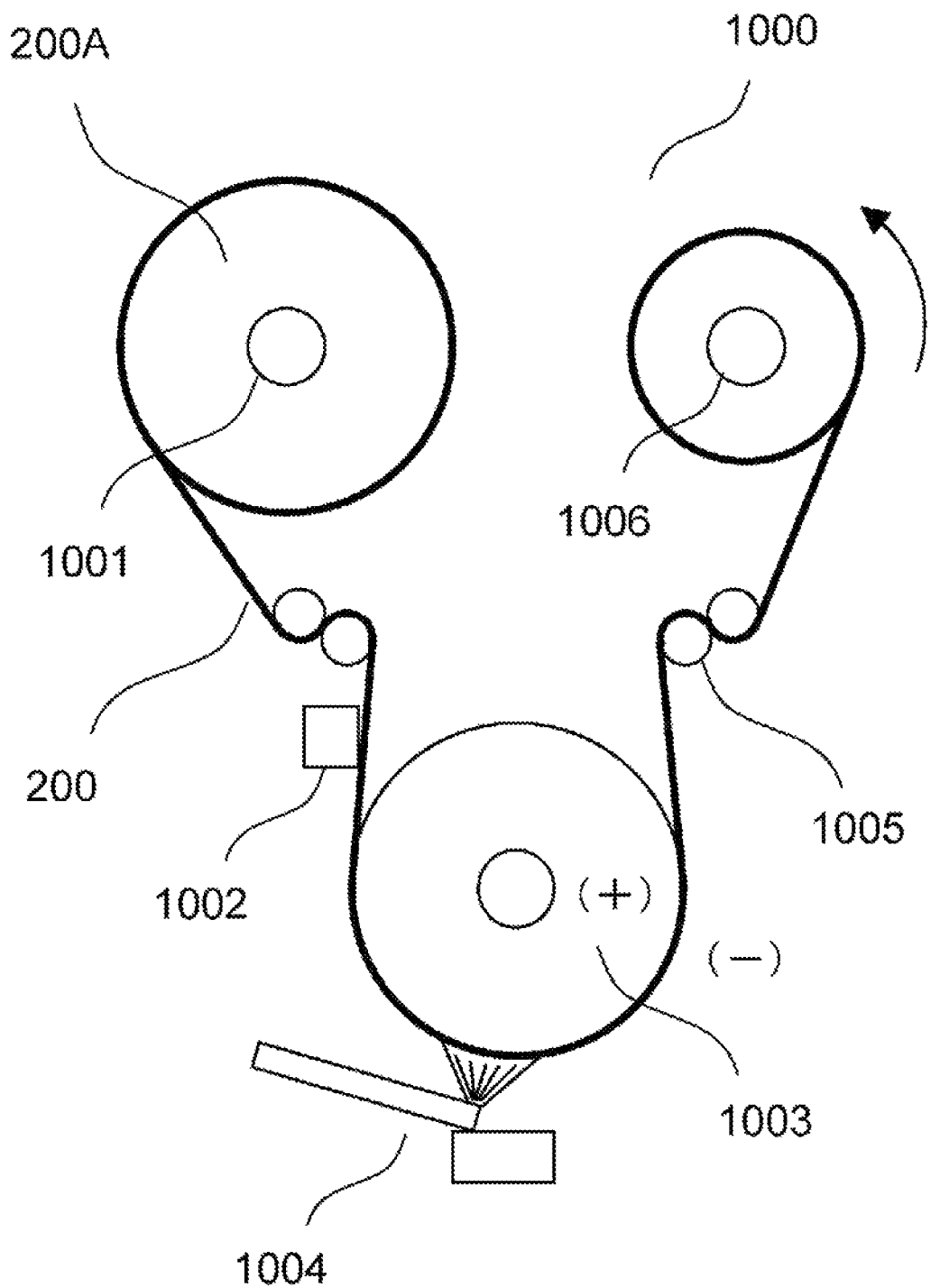
FIG. 3 is a view for explaining deposition formation of a second deposition electrode on a second film by using a vacuum deposition apparatus according to the first exemplary embodiment.

FIG. 3 is a view for explaining deposition formation of second deposition electrode 400 on second film 200 by using vacuum deposition apparatus 1000 according to the first exemplary embodiment.

In a metal deposition process, second deposition electrode 400 is formed on second film 200. As shown in FIG. 3, in a metal deposition process, second film 200 is fed from roll body 200A of second film 200 set in winding device 1001. Second film 200 passes through margin oil transfer device 1002 to make margin oil transfer device 1002 apply, onto second film 200, margin oil for forming end insulating margin portion 201, longitudinal slit portion 401, and widthwise slit portion 402, and arrives at cooling roll 1003. Second film 200 comes into contact with cooling roll 1003 to be cooled. In this state, a metal is deposited on a film surface of second film 200 by deposition device 1004, and second deposition electrode 400 is formed. At this time, second fuse pattern 405 included in second deposition electrode 400 is deposited and formed. Thereafter, second film 200 is peeled off from cooling roll 1003 and is taken up by winding device 1006 through metal intermediate roll 1005.

Vacuum deposition apparatus 1000 charges cooling roll 1003 and second film 200 to positive and negative polarities to make cooling roll 1003 and second film 200 easily come into tight contact with each other. For example, cooling roll 1003 is charged to positive polarity, and second film 200 is charged to negative polarity. In this case, when second film 200 on which second deposition electrode 400 is formed is peeled off from cooling roll 1003, peeling charge is generated in second film 200. For example, peeling charge is generated in each of pairs of first split electrodes 403a and second split electrodes 403b arranged in a widthwise direction of second deposition electrode 400. With this operation, negative charge can be retained in each of the pairs of first split electrodes 403a and second split electrodes 403b.

Figure 4A:
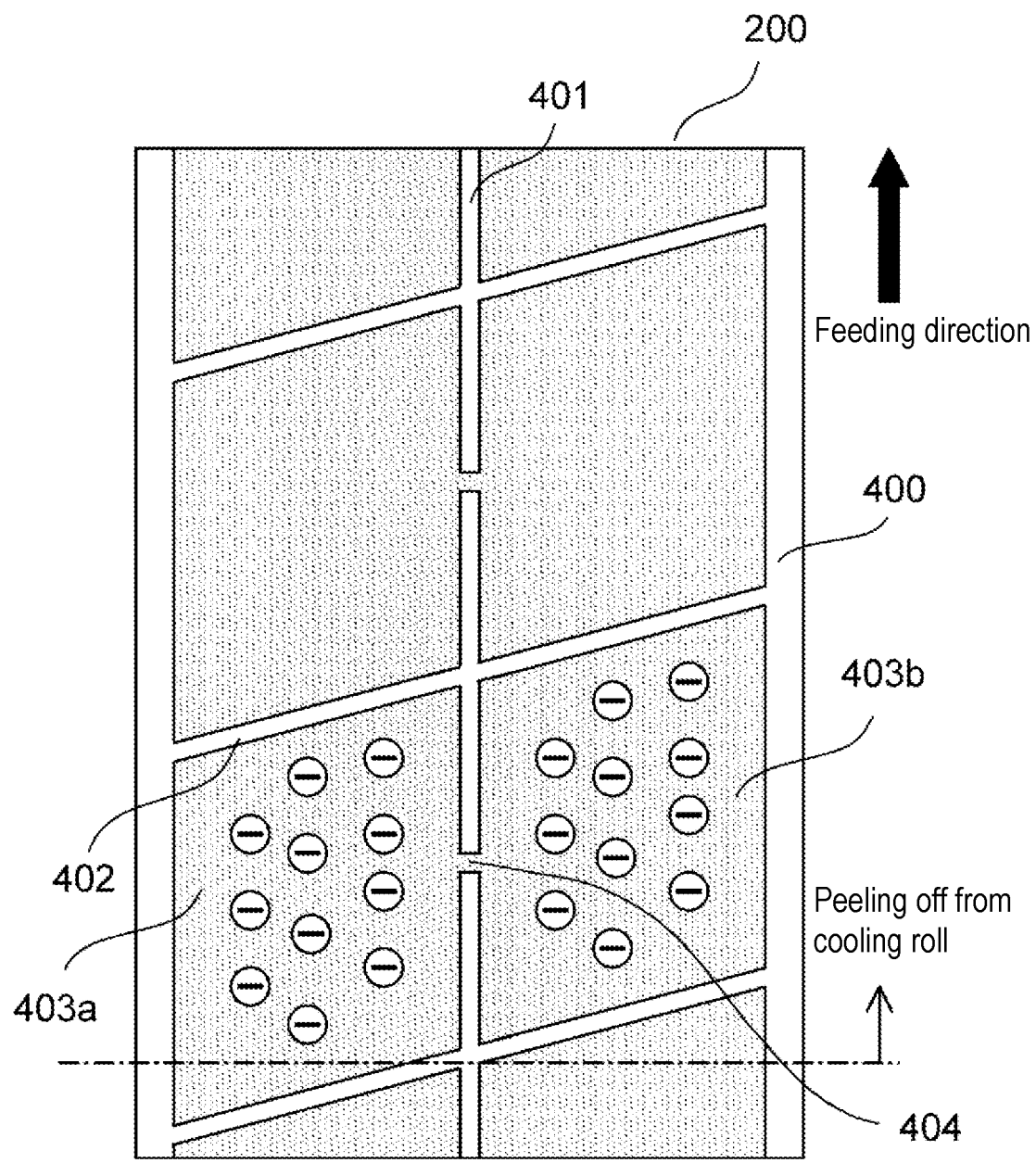
FIG. 4A is a view for explaining discharging of charge retained in a first split electrode and a second split electrode by peeling charge in a conventional case in which no second fuse pattern is provided on a second deposition electrode.
Figure 4B:
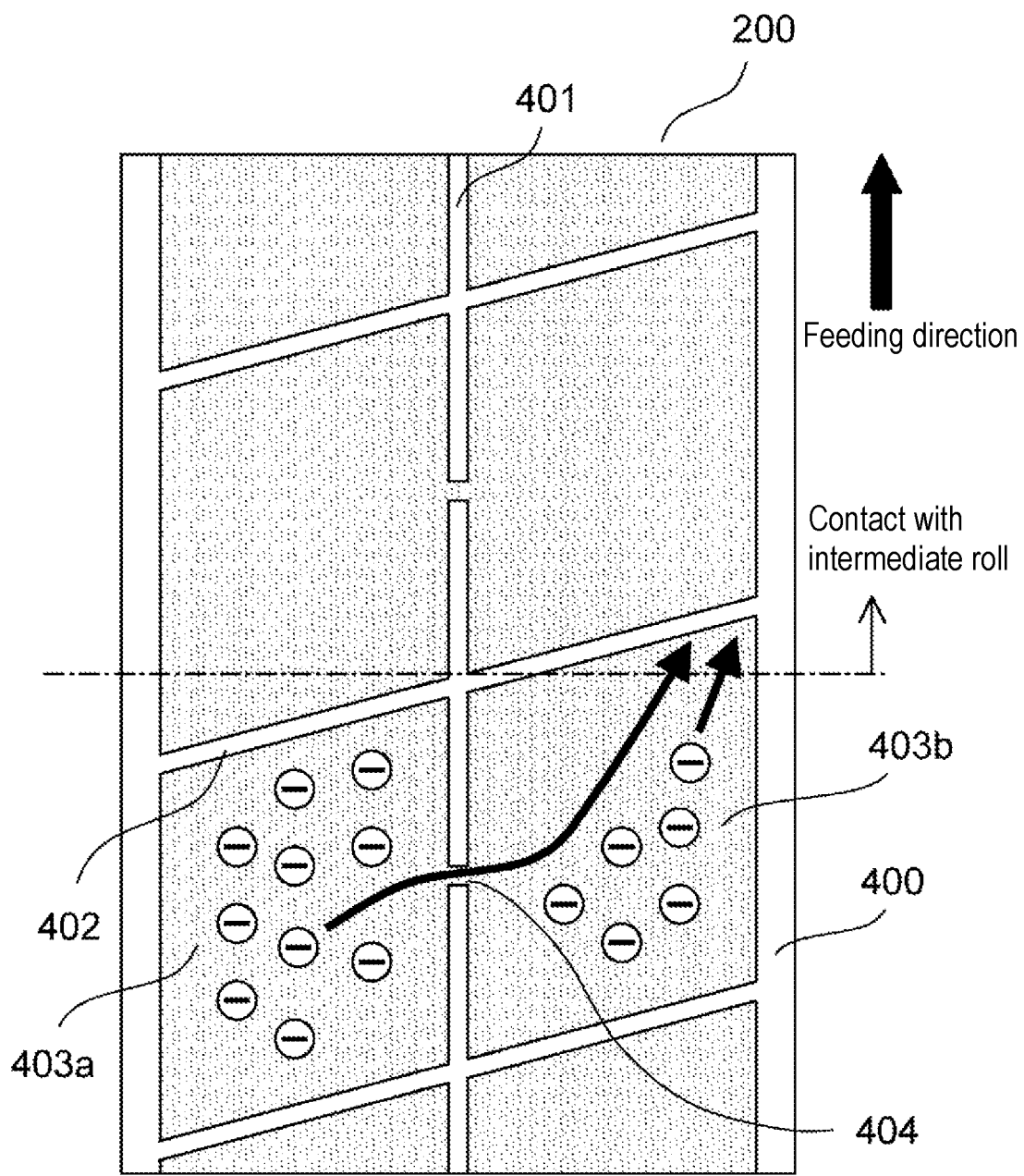
FIG. 4B is a view for explaining discharging of charge retained in a first split electrode and a second split electrode by peeling charge in a conventional case in which no second fuse pattern is provided on a second deposition electrode.

FIGS. 4A and 4B are views for explaining discharging of charge retained in first split electrode 403a and second split electrode 403b by peeling charge in a conventional case in which no second fuse pattern 405 is provided on second deposition electrode 400.

If no second fuse pattern 405 is provided on second deposition electrode 400 as in the conventional art, negative charge retained in first split electrode 403a and second split electrode 403b by peeling charge is held by split electrodes 403a and 403b, as shown in FIG. 4A. Thereafter, as shown in FIG. 4B, when first split electrodes 403a and 403b arrive at a position of intermediate roll 1005, leading part of second split electrode 403b (a distal end portion in a feeding direction) in a feeding direction of second film 200 comes into contact with intermediate roll 1005. This discharges negative charge in second split electrode 403b to intermediate roll 1005. In addition, negative charge in first split electrode 403a moves to second split electrode 403b via first fuse pattern 404 and is charged to intermediate roll 1005. At this time, a current flowing in first fuse pattern 404 may cause cracking in first fuse pattern 404.

In this exemplary embodiment, because widthwise slit portion 402 is inclined relative to a widthwise direction of second deposition electrode 400 to allow margin oil transfer device 1002 to properly apply margin oil onto widthwise slit portion 402, second split electrode 403b is a leading portion in the feeding direction. Accordingly, second split electrode 403b tends to first come into contact with intermediate roll 1005, and discharging tends to occur from first split electrode 403a to intermediate roll 1005 via first fuse pattern 404. This tends to cause cracking in first fuse pattern 404. On the other hand, unlike the above configuration, widthwise slit portion 402 is formed parallel to the widthwise direction of second deposition electrode 400 to prevent second split electrode 403b from going ahead in the feeding direction. In such a configuration as well, however, one of first split electrode 403a and second split electrode 403b can come first into contact with intermediate roll 1005. Consider, for example, a case in which intermediate roll 1005 is slightly inclined to such an extent that no trouble occurs in a normal operation of vacuum deposition apparatus 1000. Accordingly, in such a configuration as well, cracking may occur in first fuse pattern 404.

Figure 5B:
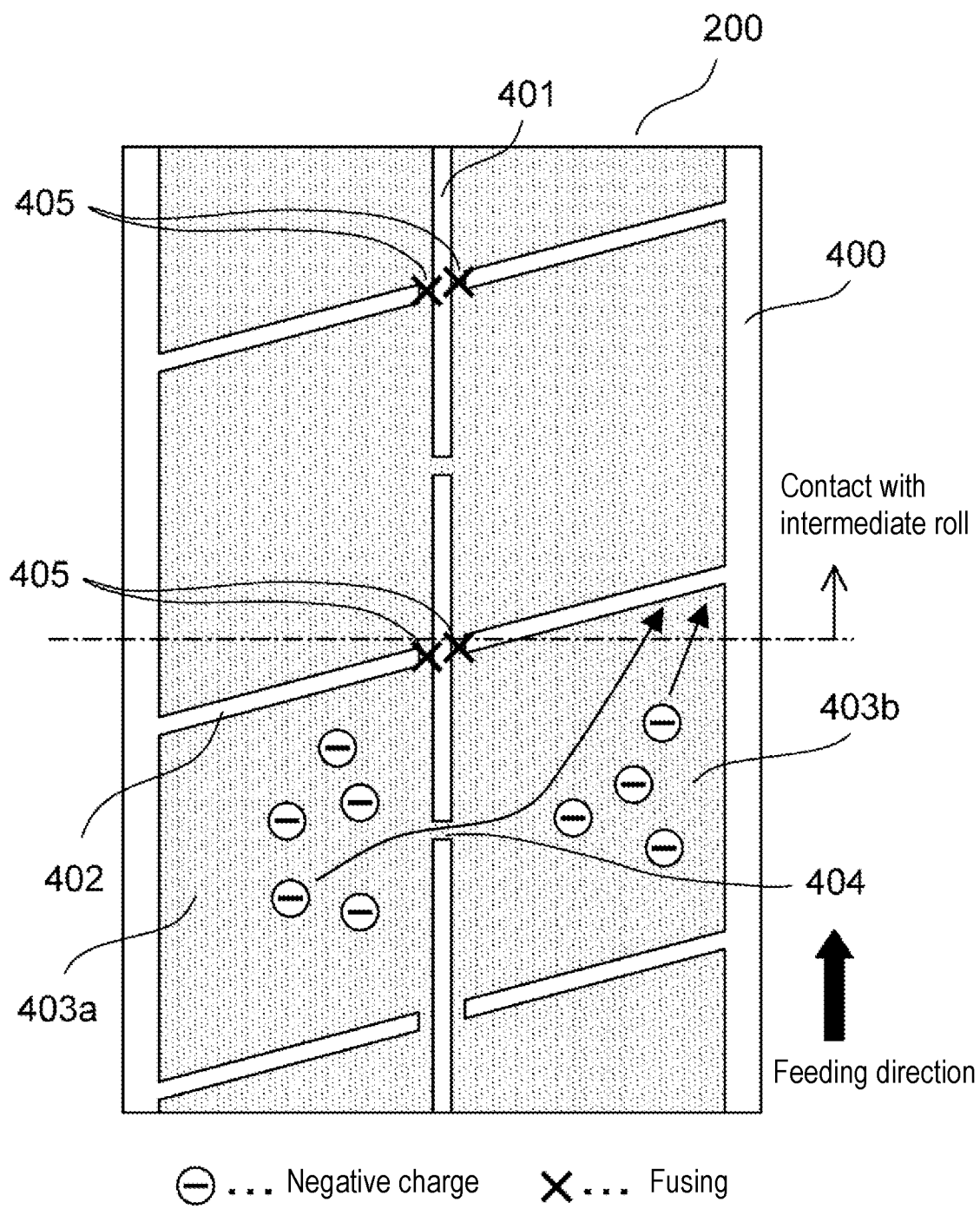
FIG. 5B is a view for explaining discharging of charge retained in a first split electrode and a second split electrode by peeling charge in the first exemplary embodiment in which a second fuse pattern is provided on a second deposition electrode.

FIGS. 5A and 5B are views for explaining discharging of charge retained in first split electrode 403a and second split electrode 403b in this exemplary embodiment in which second fuse pattern 405 is provided on second deposition electrode 400.

As shown in FIG. 5A, when second fuse pattern 405 is provided on second deposition electrode 400, negative charge retained in first split electrode 403a and second split electrode 403b by peeling charge is discharged to intermediate roll 1005 via second fuse pattern 405 when first split electrode 403a and second split electrode 403b that precede these split electrodes 403a and 403b are in contact with intermediate roll 1005. At this time, because a pattern width of second fuse pattern 405 is smaller than a pattern width of first fuse pattern 404, many second fuse patterns 405 are fused by a current flowing at the time.

Subsequently, as shown in FIG. 5B, first split electrode 403a and second split electrode 403b from which discharging has occurred to some extent arrive at the position of intermediate roll 1005, and leading part of second split electrode 403*b* comes into contact with intermediate roll 1005. This discharges negative charge in second split electrode 403*b* to intermediate roll 1005. In addition, remaining negative charge in first split electrode 403*a* moves to second split electrode 403*b* via first fuse pattern 404 and is discharged to intermediate roll 1005. At this time, as compared with the conventional art shown in FIGS. 4A and 4B, a small current flows first fuse pattern 404.

As described above, in this exemplary embodiment, because a current flowing in first fuse pattern 404 can be reduced when charge generated in split electrode 403 by peeling charge is discharged, it is possible to suppress occurrence of cracking in first fuse pattern 404.

In film capacitor 1A after being manufactured, because many second fuse patterns 405 are fused, when dielectric breakdown occurs in first film 100 and second film 200 in part of split electrode 403, second fuse pattern 405 does not easily cause a trouble, and a large current quickly flows in first fuse pattern 404 to smoothly fuse first fuse pattern 404, thus properly preventing permanent short-circuit.

When second fuse pattern 405 is fused, damage such as hole breakage sometimes occurs in second film 200. In this exemplary embodiment, because second fuse pattern 405 is provided inside ineffective electrode region RA2, i.e., outside effective electrode region RA1, even if damage occurs in second film 200 at a position of second fuse pattern 405, withstand voltage deterioration in film capacitor 1A can be avoided.

Second Exemplary Embodiment

Film capacitor 1B according to the second exemplary embodiment will be described next.

In this exemplary embodiment, first fuse pattern 805 corresponds to a "first fuse portion" described in the appended claims. Moreover, second fuse pattern 806 corresponds to a "second fuse portion" described in the appended claims.

However, the above description is only intended to define correspondences between constituents shown in the appended claims and constituents shown in the exemplary embodiment. The correspondences described above should not be construed to limit the scope of the invention described in the appended claims to the configuration described in the exemplary embodiment.

Figure 6A:
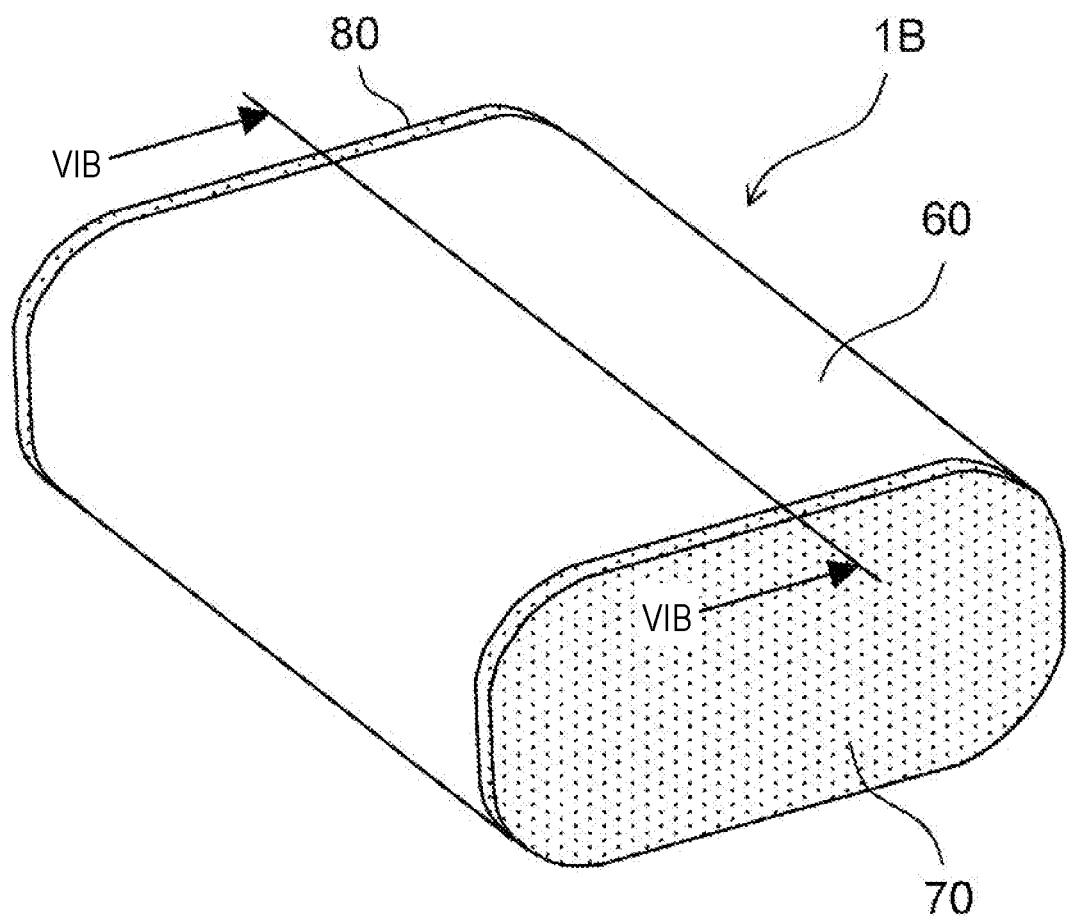
FIG. 6A is a perspective view of a film capacitor according to the second exemplary embodiment.
Figure 6B:
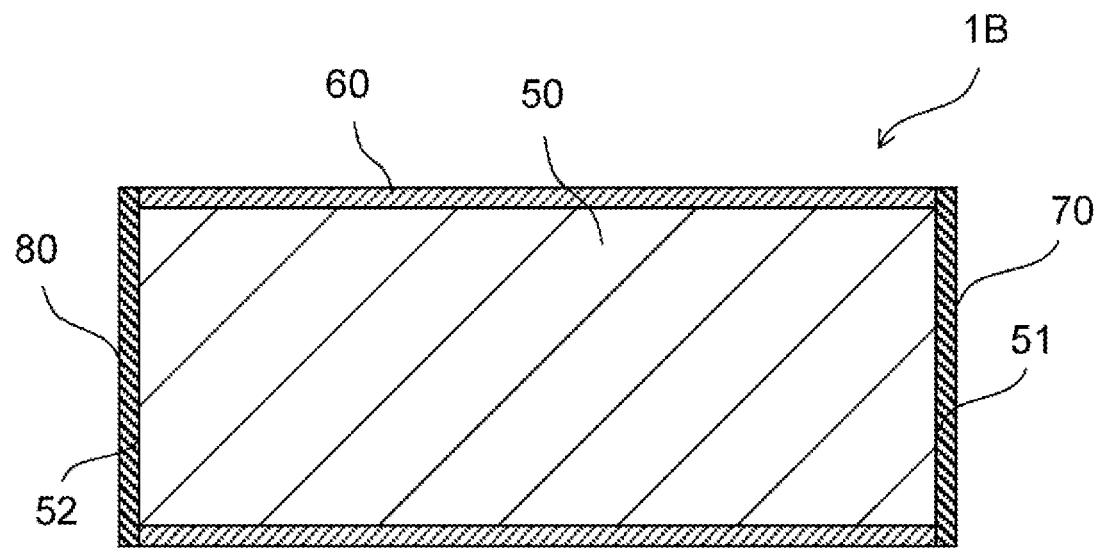
FIG. 6B is a sectional view of the film capacitor taken along line VIB-VIB of FIG. 6A according to the second exemplary embodiment.

FIG. 6A is a perspective view of film capacitor 1B according to the second exemplary embodiment, and FIG. 6B is a vertical sectional view of film capacitor 1B taken along VIB-VIB in FIG. 6A.

Film capacitor 1B includes capacitor body 50, exterior film 60, first end-face electrode 70, and second end-face electrode 80. Exterior film 60, first end-face electrode 70, and second end-face electrode 80 have the same configurations as those of exterior film 20, first end face electrode 30, and second end face electrode 40 of film capacitor 1A according to the first exemplary embodiment. Film capacitor 1B, i.e., capacitor body 50, employs a structure formed of one capacitor, and hence a width between first end face 51 and second end face 52 of capacitor body 50 is smaller than a width between first end face 11 and second end face 12 of capacitor body 10 of film capacitor 1A according to the first exemplary embodiment.

Figure 7A:
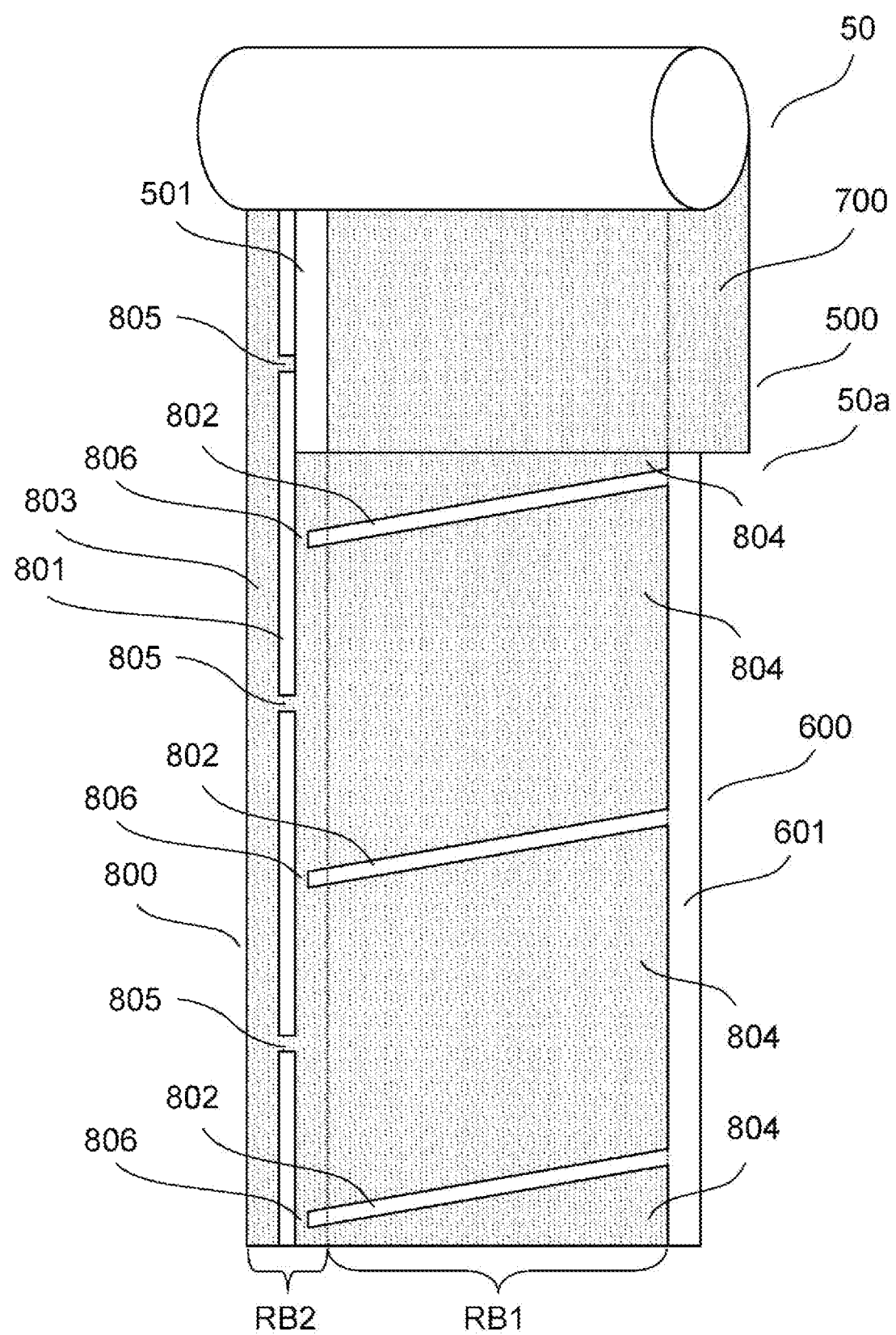
FIG. 7A is a plan view of a capacitor body in a state in which a first film and a second film are partly wound according to the second exemplary embodiment.
Figure 7B:
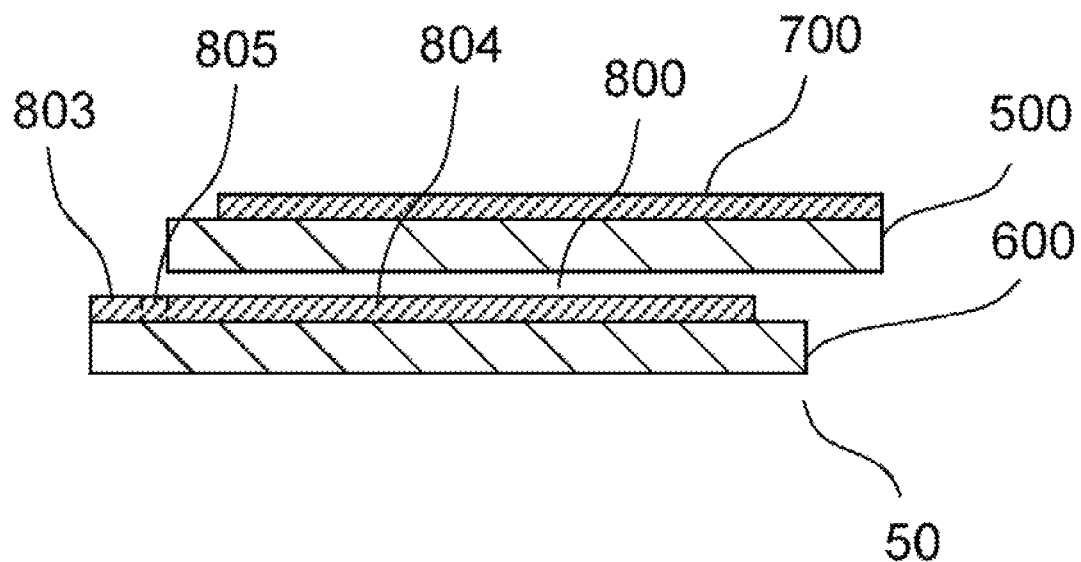
FIG. 7B is a sectional view of the capacitor body cut at a portion of the first fuse pattern in the widthwise direction according to the second exemplary embodiment.
Figure 7C:
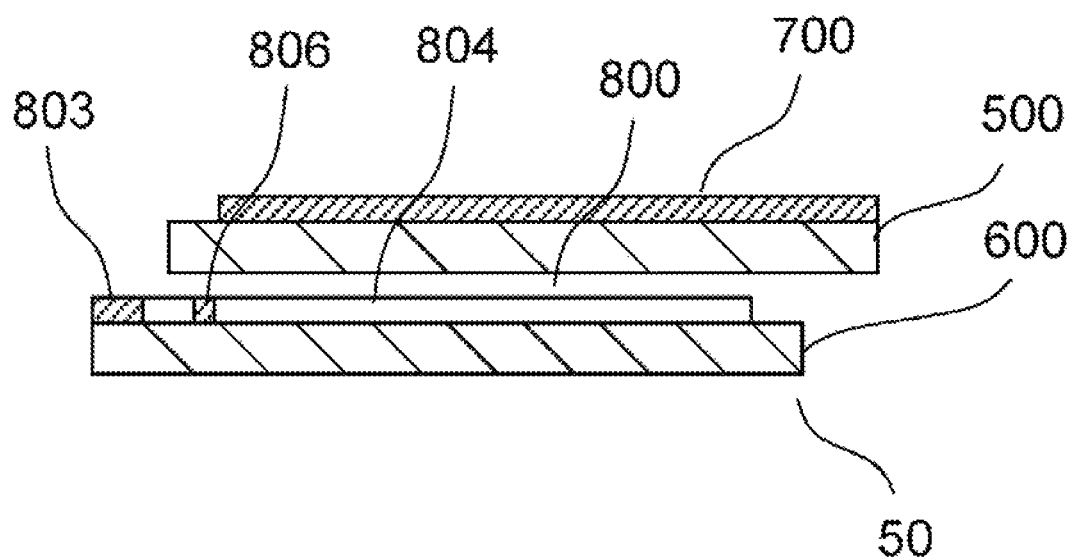
FIG. 7C is a sectional view of the capacitor body cut at a portion of the second fuse pattern in the widthwise direction along a widthwise slit portion according to the second embodiment.
Figure 7D:
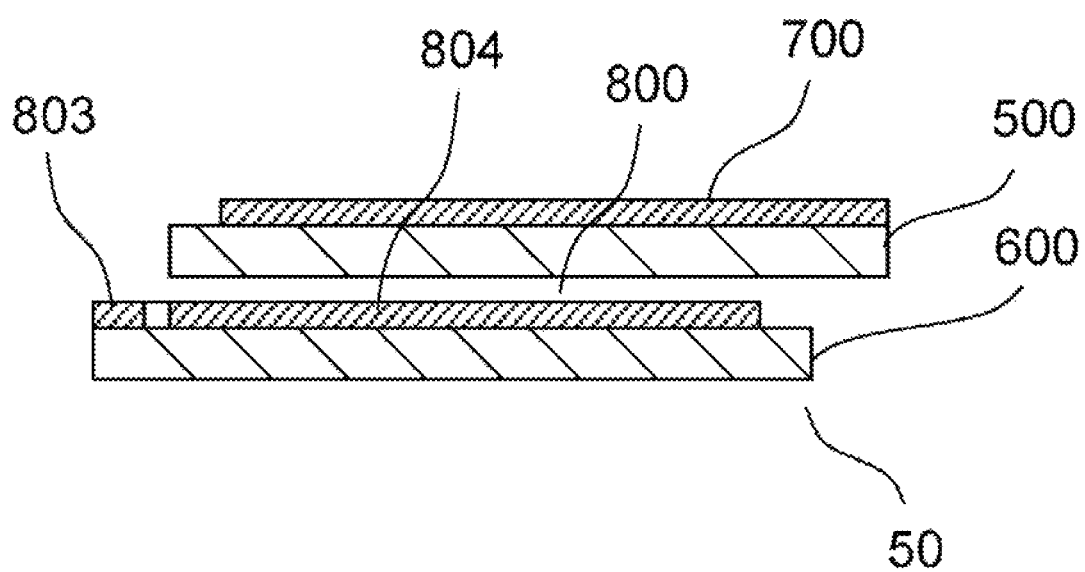
FIG. 7D is a sectional view of the capacitor body cut at a portion where neither first fuse pattern nor the second fuse pattern is provided in the widthwise direction according to the second exemplary embodiment.

FIG. 7A is a plan view of capacitor body 50 in a state in which first film 500 and second film 600 are partly wound according to the second exemplary embodiment. FIG. 7B is a sectional view of capacitor body 50 cut at a portion of first fuse pattern 805 along a widthwise direction. FIG. 7C is a sectional view of capacitor body 50 cut at a portion of second fuse pattern 806 along the widthwise direction slit portions 802 in the widthwise direction. FIG. 7D is a sectional view of capacitor body 50 cut at a portion where neither first fuse pattern 805 nor second fuse pattern 806 is provided along the widthwise direction according to the second exemplary embodiment.

Capacitor body 50 includes first film 500, second film 600, first deposition electrode 700, and second deposition electrode 800.

First film 500 and second film 600 are wound in a stacked state such that first film 500 is located inside (on an upper side), and second film 600 is located outside (on a lower side). First film 500 and second film 600 are dielectric films formed of a resin material such as polypropylene (PP), polyethylene terephthalate (PET), and polyethylene naphthalate (PEN). First film 500 and second film 600 have almost the same width dimension. First insulating margin portion 501 is formed on one end of first film 500 in a widthwise direction of first film 500 so as to extend in a longitudinal direction of first film 500. Second insulating margin portion 601 is formed on the other side to one end of first film 500 in a widthwise direction of second film 600 so as to extend in a longitudinal direction of second film 600. First insulating margin portion 501 and second insulating margin portion 601 are margin portions on which no metal is deposited.

First deposition electrode 700 is formed by depositing a metal such as aluminum on one (upper) film surface of first film 500. First deposition electrode 700 is formed so as to be continuous without being split in the longitudinal direction of first film 500. First deposition electrode 700 is formed up to the other end in the widthwise direction of first film 500 so as to be continuous with second end-face electrode 80.

Second deposition electrode 800 is formed on one (upper) film surface of second film 600 which faces the other (lower) film surface of first film 500 by deposition of a metal such as aluminum. Second deposition electrode 800 is formed up to an end on an opposite side to a second insulating margin portion 601 in the widthwise direction of second film 600 so as to be continuous with first end-face electrode 70.

Longitudinal slit portion 801 is formed in an end portion of second deposition electrode 800 which is continuous with first end-face electrode 70 so as to extend in a longitudinal direction of second deposition electrode 800. Widthwise slit portions 802 are formed on second deposition electrode 800 so as to cross second deposition electrode 800 in a widthwise direction of second deposition electrode 800 at predetermined intervals in a longitudinal direction of second deposition electrode 800. Widthwise slit portions 802 are formed to extend from longitudinal slit portion 801 to second insulating margin portion 601 so as to be inclined in the widthwise direction. Second deposition electrode 800 is split into common electrode 803 extending in the longitudinal direction of second deposition electrode 800 and continuous with first end-face electrode 70 and a plurality of split electrodes 804 arranged in the longitudinal direction of second deposition electrode 800 by longitudinal slit portion 801 and the plurality of widthwise slit portions 802.

Capacitor 50*a* includes first deposition electrode 700 and each split electrode 804 facing first deposition electrode 700.

Capacitor body 50 includes effective electrode region RB1 where first deposition electrode 700 and second deposition electrode 800 overlap each other and ineffective electrode region RB2 shifted from effective electrode region RB1 in the widthwise direction of first deposition electrode 700 and second deposition electrode 800.

Longitudinal slit portion 801 is provided in ineffective electrode region RB2. Accordingly, on second deposition electrode 800, ineffective electrode region RB2 includes a portion, of each split electrode 804, which is located near longitudinal slit portion 801. Effective electrode region RB1 includes a portion, of each split electrode 804, which overlaps first deposition electrode 700. Effective electrode region RB1 contributes a capacitance of capacitor 50a.

First fuse pattern 805 is formed between each split electrode 804 and common electrode 803 so as to bridge over longitudinal slit portion 801. A pattern width of first fuse pattern 805 is set to, for example, about 0.5 mm.

Second fuse pattern 806 is formed between two split electrodes 804 adjacent to each other in the longitudinal direction of second deposition electrode 800 so as to bridge over widthwise slit portions 802 in ineffective electrode region RB2. A pattern width of second fuse pattern 806 is set to be smaller than a pattern width of first fuse pattern 805, for example, about 0.2 mm. With this setting, second fuse pattern 806 can be fused by a current smaller than current for first fuse pattern 805.

As in film capacitor 1A according to the first exemplary embodiment, in film capacitor 1B according to the second exemplary embodiment, first deposition electrode 700 and second deposition electrode 800 are respectively deposited and formed on first film 500 and second film 600 in a manufacturing process by using vacuum deposition apparatus 1000. At this time, second fuse pattern 806 included in second deposition electrode 800 is deposited and formed.

As in the first exemplary embodiment, in vacuum deposition apparatus 1000, when second film 600 on which second deposition electrode 800 is formed is peeled off from cooling roll 1003, peeling charge is easily generated in each split electrode 804 of second deposition electrode 800.

Figure 8A:
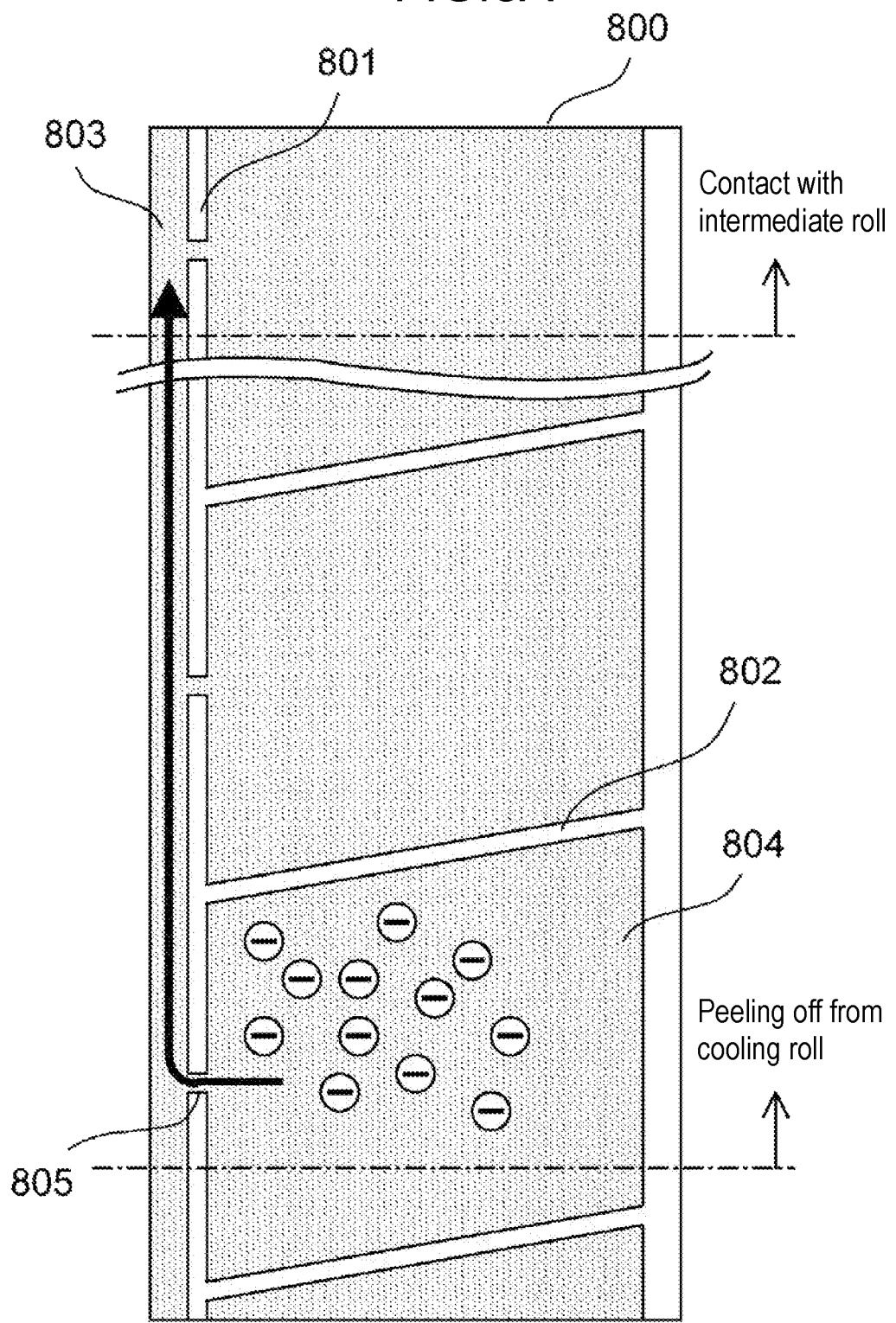
FIG. 8A is a view for explaining discharging of charge retained in a split electrode by peeling charge in a conventional case in which no second fuse pattern is provided on the second deposition electrode.

FIG. 8A is a view for explaining discharging of charge retained in split electrode 804 by peeling charge in a conventional case in which no second fuse pattern 806 is provided on second deposition electrode 800. FIG. 8B is a view for explaining discharging of charge retained in split electrode 804 by peeling charge in this exemplary embodiment in which second fuse pattern 806 is provided on second deposition electrode 800.

As in the conventional art, when no second fuse pattern 806 is provided on second deposition electrode 800, negative charge retained in split electrode 804 by peeling charge reaches common electrode 803 via first fuse pattern 805, as shown in FIG. 8A. A distal end portion of common electrode 803 is in contact with intermediate roll 1005, and hence negative charge reaching the common electrode 803 moves to the distal end and is discharged to intermediate roll 1005. At this time, a current flowing in first fuse pattern 805 may cause cracking in first fuse pattern 805.

On the other hand, when second fuse pattern 806 is provided on second deposition electrode 800, as shown in FIG. 8B, part of negative charge retained in split electrode 804 by peeling charge reaches preceding split electrode 804 via second fuse pattern 806, and reaches common electrode 803 via first fuse pattern 805 of split electrode 804. This reduces negative charge passing through first fuse pattern 805 on split electrode 804 charged by peeling. Consequently, a current flowing in first fuse pattern 805 is reduced as compared with the conventional art shown in FIG. 8A. Note that each second fuse pattern 806 has a smaller pattern width than first fuse pattern 805, and hence many second fuse patterns 806 are fused by a current flowing at this time.

As described above, when charge generated in split electrode 804 by peeling charge is discharged, a current flowing in first fuse pattern 805 can be reduced, and hence occurrence of cracking in first fuse pattern 805 is suppressed.

In film capacitor 1B after being manufactured, because many second fuse patterns 806 are fused, when dielectric breakdown occurs in first film 500 and second film 600 in part of split electrode 804, first fuse pattern 805 can be easily fused to properly prevent permanent short-circuit as in the first exemplary embodiment.

In addition, because second fuse pattern 806 is provided inside ineffective electrode region RB2, i.e., outside effective electrode region RB1, even if damage occurs in second film 600 at a position of second fuse pattern 806, withstand voltage deterioration in film capacitor 1B can be avoided as in the first exemplary embodiment.

<Modification>

Although the exemplary embodiments of the present disclosure have been described above, the present disclosure is not limited to the exemplary embodiments described above, and moreover, various modifications can be applied to application examples according to the present disclosure besides the exemplary embodiments described above.

Figure 9A:
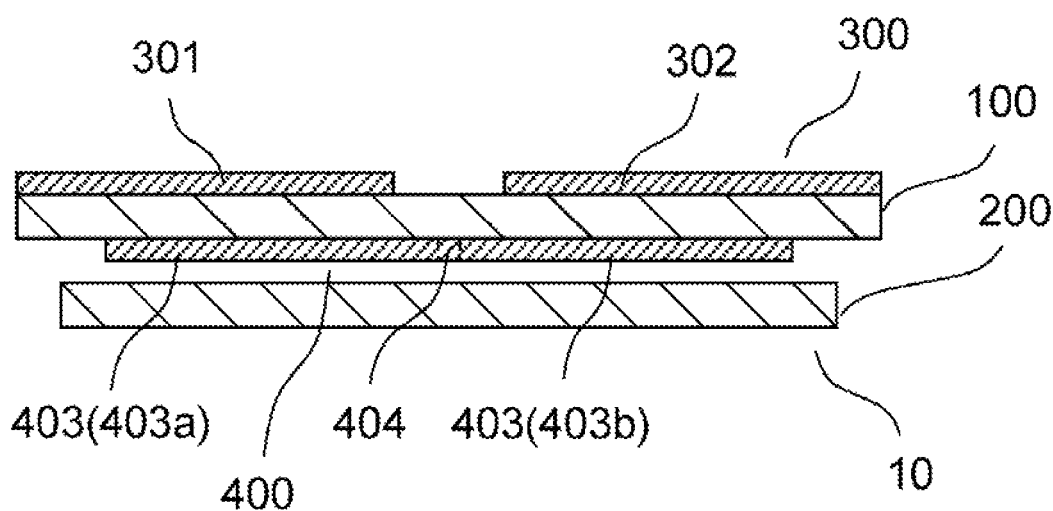
FIG. 9A is a view for explaining a capacitor body according to a modification.
Figure 9B:
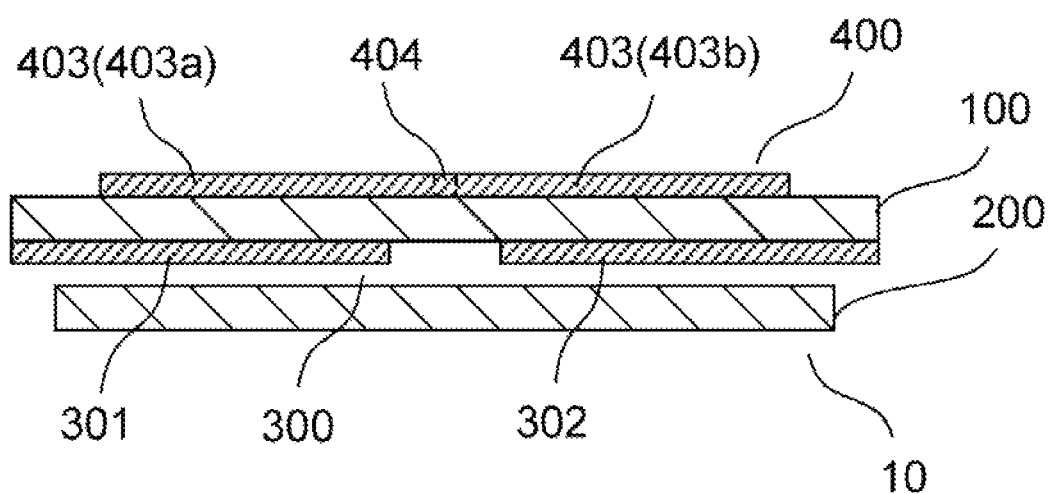
FIG. 9B is a view for explaining a capacitor body according to a modification.
Figure 9C:
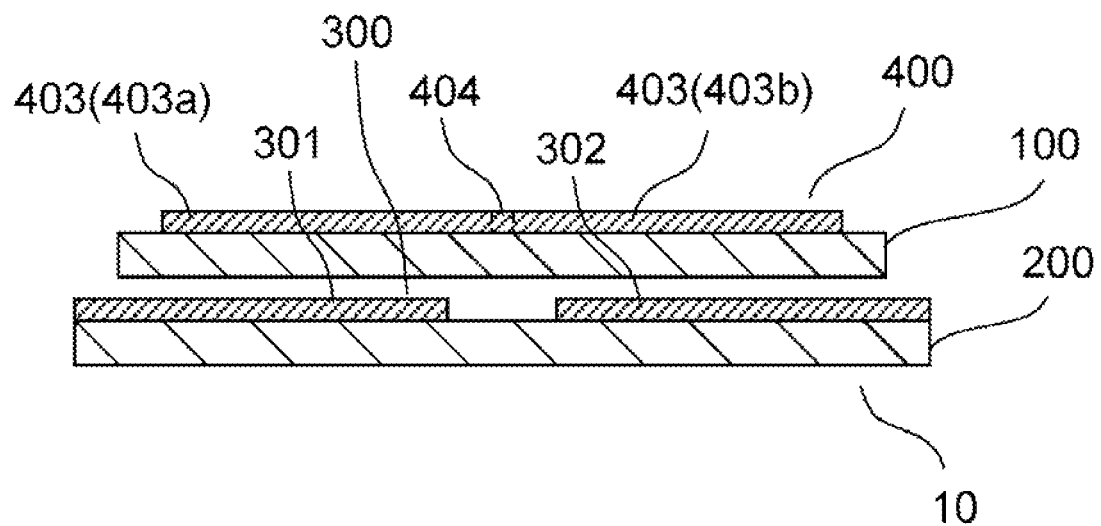
FIG. 9C is a view for explaining a capacitor body according to a modification.

For example, in the above first exemplary embodiment, first deposition electrode 300 is formed on one (upper) film surface of first film 100, and second deposition electrode 400 is formed on the other (upper) film surface of second film 200. However, as shown in FIG. 9A, first deposition electrode 300 may be formed on one (upper) film surface of first film 100, and second deposition electrode 400 may be formed on the other (lower) film surface of first film 100. In addition, as shown in FIG. 9B, second deposition electrode 400 may be formed on one (upper) film surface of first film 100, and first deposition electrode 300 may be formed on the other (lower) film surface of first film 100. Furthermore, as shown in FIG. 9C, second deposition electrode 400 may be formed on one (upper) film surface of first film 100, and first deposition electrode 300 may be formed on the other (upper) film surface of second film 200. In this case, the second film 200 has a larger width dimension than first film 100.

Figure 9D:
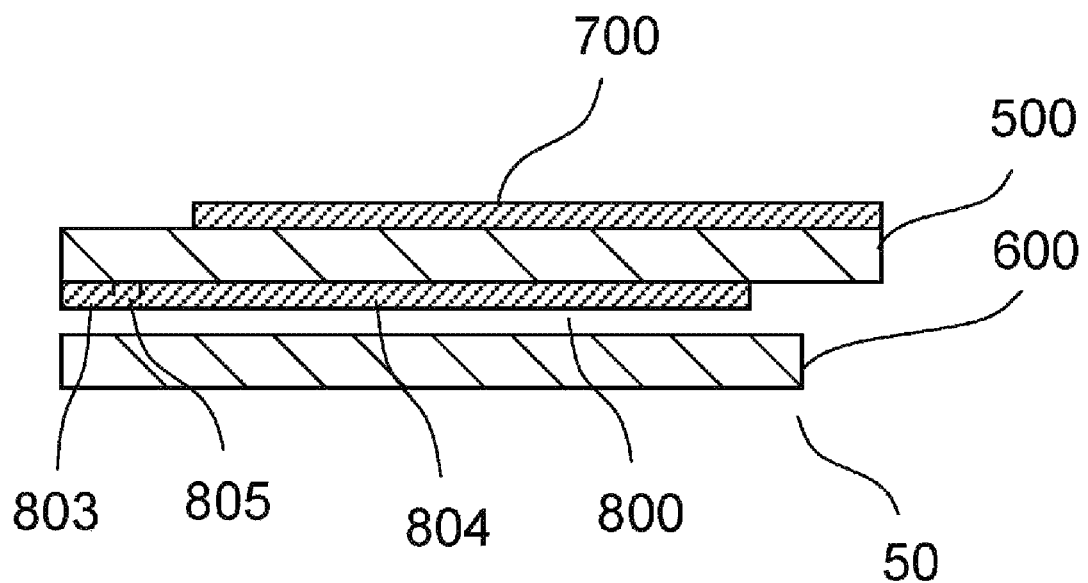
FIG. 9D is a view for explaining a capacitor body according to a modification.
Figure 9E:
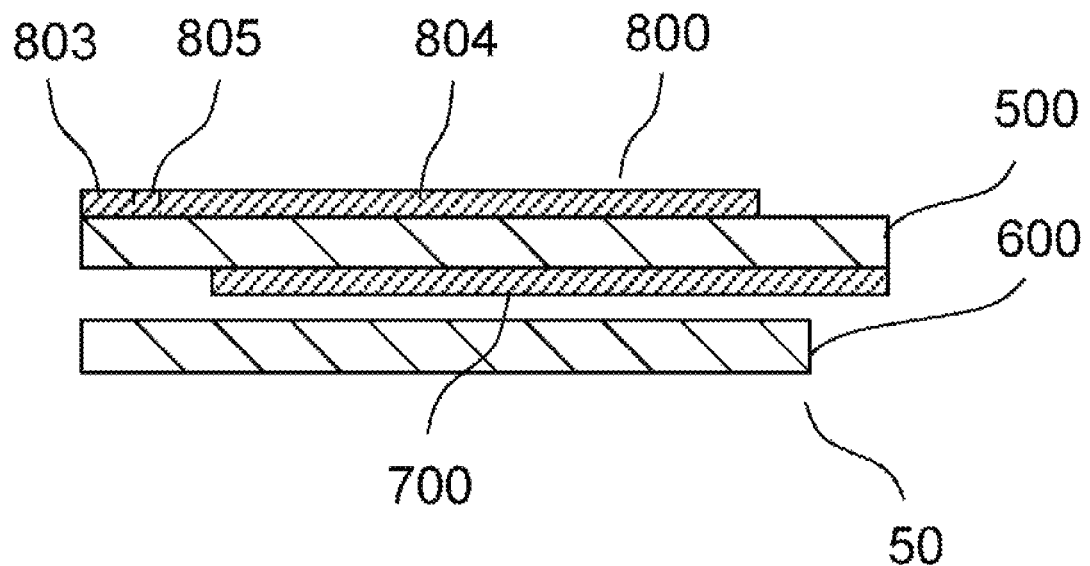
FIG. 9E is a view for explaining a capacitor body according to a modification.
Figure 9F:
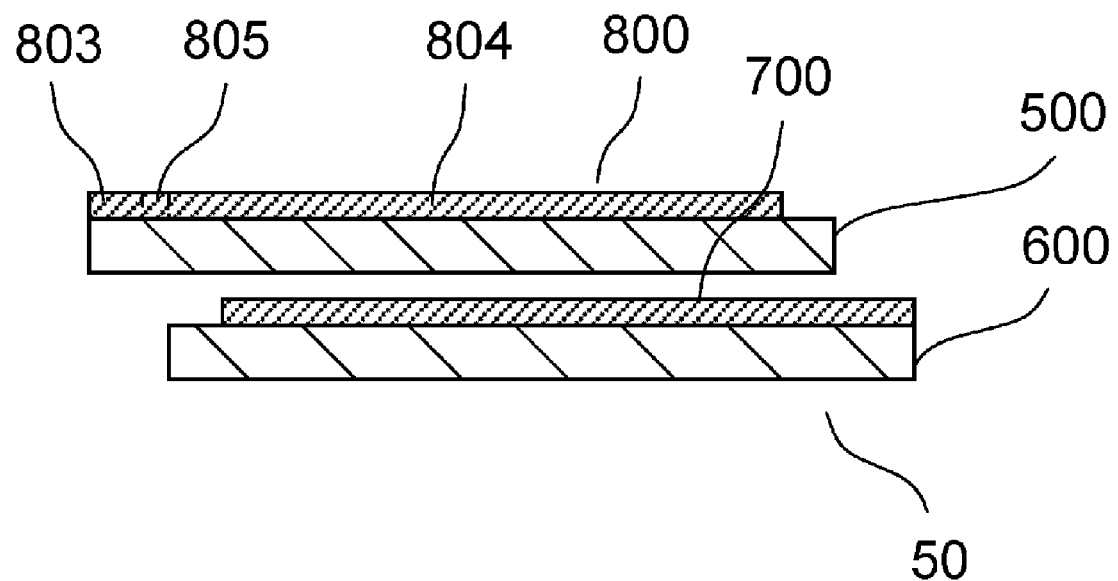
FIG. 9F is a view for explaining a capacitor body according to a modification.

In the second exemplary embodiment, first deposition electrode 700 is formed on one (upper) film surface of first film 500, and second deposition electrode 800 is formed on the other (upper) film surface of second film 600. However, as shown in FIG. 9D, first deposition electrode 700 may be formed on one (upper) film surface of first film 500, and second deposition electrode 800 may be formed on the other (lower) film surface of first film 500. In addition, as shown in FIG. 9E, second deposition electrode 800 may be formed on one (upper) film surface of first film 500, and first deposition electrode 700 may be formed on the other (lower) film surface of first film 500. In these cases, first film 500 has a larger width dimension than second film 600. In addition, as shown in FIG. 9F, second deposition electrode 800 may be formed on one (upper) film surface of first film 500, and first deposition electrode 700 may be formed on the other (upper) film surface of second film 600.

In the first exemplary embodiment and the second exemplary embodiment, letting second fuse patterns 405, 806 have a smaller pattern width than first fuse patterns 404, 805 can fuse second fuse patterns 405, 806 with a current smaller than a current for first fuse patterns 404, 805. However, not limited to this, for example, a film thickness of second fuse patterns 405, 806 may be set to be smaller than a film thickness of first fuse patterns 404, 805 to make it possible to fuse second fuse patterns 405, 806 with a current smaller than a current for first fuse patterns 404, 805.

In the above first exemplary embodiment, the present disclosure is applied to film capacitor 1A structured to have two capacitors connected in series. However, the present disclosure can also be applied to a film capacitor structured to have three or more capacitors connected in series.

In addition, various modifications can be made to the exemplary embodiments of the present disclosure as appropriate within the scope of the technical idea disclosed in the appended claims.

The present disclosure can be effectively applied to a film capacitor used in various types of electronic devices, electric devices, industrial devices, and vehicle electrical components and a method for manufacturing such a film capacitor.

What is claimed is:

1. A film capacitor comprising:
a first film and a second film wound in a stacked state; and
a first deposition electrode and a second deposition electrode each formed by metal deposition,
wherein one deposition electrode of the first deposition electrode and the second deposition electrode is disposed on one film surface of the first film,
an other deposition electrode of the first deposition electrode and the second deposition electrode is disposed on an other film surface of the first film or a film surface of the second film that faces the other film surface,
the second deposition electrode includes widthwise slit portions, the widthwise slit portions crossing the second deposition electrode in a widthwise direction of the second deposition electrode and being disposed at predetermined intervals in a longitudinal direction of the second deposition electrode, the second deposition electrode being split into a plurality of split electrodes in the longitudinal direction by the widthwise slit portions,
the second deposition electrode includes a longitudinal slit portion extending in the longitudinal direction of the second deposition electrode in an ineffective electrode region shifted, in the widthwise direction of the second deposition electrode, from an effective electrode region where the first deposition electrode and the second deposition electrode overlap each other,
a first fuse portion is connected to each of the plurality of split electrodes so as to bridge over the longitudinal slit portion, and
in the ineffective electrode region, between two split electrodes adjacent to each other in the longitudinal direction of the second deposition electrode among the plurality of split electrodes, a second fuse portion that is configured to be fused by a current smaller than a current for the first fuse portion is provided so as to bridge over a widthwise slit portion between the two split electrodes among the plurality of the widthwise slit portions.

2. The film capacitor according to claim 1, wherein the first deposition electrode is split in a widthwise direction of the first deposition electrode by an insulating margin portion wider than the longitudinal slit portion extending in a longitudinal direction of the first deposition electrode,
the plurality of split electrodes are provided on both sides of the longitudinal slit portion separately in the widthwise direction of the second deposition electrode,
the longitudinal slit portion overlaps the insulating margin portion, the ineffective electrode region includes a portion, of each of the plurality of split electrodes, that is located near the longitudinal slit portion overlapping the insulating margin portion on the split electrode, and
the two split electrodes arranged in the widthwise direction of the second deposition electrode are connected via the first fuse portion.

3. The film capacitor according to claim 1, wherein the first fuse portion is formed by a fuse pattern, and the second fuse portion is formed by a fuse pattern having a smaller pattern width than the first fuse portion.

4. The film capacitor according to claim 2, wherein the first fuse portion is formed by a fuse pattern, and the second fuse portion is formed by a fuse pattern having a smaller pattern width than the first fuse portion.

5. A method for manufacturing a film capacitor including a first film and a second film wound in a stacked state, and a first deposition electrode and a second deposition electrode each formed by metal deposition,
wherein one deposition electrode of the first deposition electrode and the second deposition electrode is disposed on one film surface of the first film,
an other deposition electrode of the first deposition electrode and the second deposition electrode is disposed on an other film surface of the first film or a film surface of the second film that faces the other film surface,
the second deposition electrode includes widthwise slit portions, the widthwise slit portions crossing the second deposition electrode in a widthwise direction of the second deposition electrode and being disposed at predetermined intervals in a longitudinal direction of the second deposition electrode, the second deposition electrode being split into a plurality of split electrodes in the longitudinal direction by the widthwise slit portions,
the second deposition electrode includes a longitudinal slit portion extending in the longitudinal direction of the second deposition electrode in an ineffective electrode region shifted, in the widthwise direction of the second deposition electrode, from an effective electrode region where the first deposition electrode and the second deposition electrode overlap each other,
a first fuse portion is connected to each of the plurality of split electrodes so as to bridge over the longitudinal slit portion, the method comprising,
when depositing and forming the second deposition electrode on a film corresponding to the second deposition electrode, depositing and forming a second fuse portion that is configured to be fused by a current smaller than a current for the first fuse portion so as to bridge over a widthwise slit portion in the ineffective electrode region and between two split electrodes adjacent to each other in the longitudinal direction of the second deposition electrode among the plurality of split electrodes, the widthwise slit portion being among the plurality of widthwise slit portions.

* * * * *